US008700562B2

(12) United States Patent
Schmitt et al.

(10) Patent No.: US 8,700,562 B2
(45) Date of Patent: Apr. 15, 2014

(54) SYSTEMS AND METHODS FOR ONLINE TRANSACTIONAL DATA PROCESSING

(75) Inventors: Winfried Schmitt, Walldorf (DE); Radim Sykora, Nussloch (DE)

(73) Assignee: SAP AG, Walldorf (DE)

( * ) Notice: Subject to any disclaimer, the term of this patent is extended or adjusted under 35 U.S.C. 154(b) by 1577 days.

(21) Appl. No.: 11/149,191

(22) Filed: Jun. 10, 2005

(65) Prior Publication Data

US 2005/0283492 A1    Dec. 22, 2005

(30) Foreign Application Priority Data

Jun. 22, 2004   (EP) .................................... 04014632

(51) Int. Cl.
*G06F 7/00*  (2006.01)
*G06F 17/00* (2006.01)

(52) U.S. Cl.
USPC ........................... 707/607; 707/661; 711/161

(58) Field of Classification Search
USPC .................................. 707/607, 661, 999.204
See application file for complete search history.

(56) References Cited

U.S. PATENT DOCUMENTS

| 5,813,009 | A  | * | 9/1998  | Johnson et al. ............... 707/695 |
| 5,832,508 | A  | * | 11/1998 | Sherman et al. ....................... 1/1 |
| 6,014,674 | A  | * | 1/2000  | McCargar ............................. 1/1 |
| 6,157,927 | A  | * | 12/2000 | Schaefer et al. ....................... 1/1 |
| 6,263,060 | B1 | * | 7/2001  | MeLampy et al. ....... 379/114.15 |
| 6,324,681 | B1 | * | 11/2001 | Sebesta et al. ................. 717/102 |
| 6,345,280 | B1 |   | 2/2002  | Clark et al. |
| 6,374,264 | B1 | * | 4/2002  | Bohannon et al. .................... 1/1 |
| 6,847,973 | B2 | * | 1/2005  | Griffin et al. .......................... 1/1 |
| 2002/0038306 | A1 | * | 3/2002 | Griffin et al. ................. 707/101 |
| 2002/0099843 | A1 |   | 7/2002 | Fruchtman et al. |
| 2004/0158549 | A1 | * | 8/2004 | Matena et al. ..................... 707/1 |
| 2004/0225649 | A1 | * | 11/2004 | Yeo et al. .......................... 707/3 |
| 2004/0254926 | A1 | * | 12/2004 | Balogh ............................. 707/4 |

OTHER PUBLICATIONS

Konopnicki et al, Information Gathering in the World Wide Web: The W3QL Query Language and the W3QS System, ACM 1999.*
Clark D. French, "Teaching an OLTP database kernel advanced data warehousing techniques" Data Engineering, 1997, Proceedings of the 13th International Conference, pp. 194-198.
Shreekant S. Thakkar and Mark Sweiger, "Performance of an OLTP application on Symmetry multiprocessor system", Computer Architecture, 1990, Proceedings of the 17th Annual International Symposium, pp. 228-238.
Search and Examination Report from the European Patent Office for EP Application 04014632.6 dated Nov. 3, 2004 (9 pages).
Communication from the European Patent Office for EP Application 04014632.6 dated Feb. 10, 2006 (6 pages).

* cited by examiner

*Primary Examiner* — Daniel Kuddus
(74) *Attorney, Agent, or Firm* — Finnegan, Henderson, Farabow, Garrett & Dunner, LLP

(57) ABSTRACT

An online transactional data processing (OLTP) system is provided that includes a relational database for storing transactional data, an OLTP application program for processing the transactional data, and a change log for storing a set of change documents that describe transformations performed on the transactional data by the OLTP application program. To correct a run of the OLTP application program, the set of change documents is used to re-establish the original state. A re-run of the OLTP application program may produce a new set of change documents in the random access memory (RAM) of the OLTP system. Further, the original set of change documents stored in the change log may be at least partly overwritten by the new set of change documents.

15 Claims, 5 Drawing Sheets

SYSTEMS AND METHODS FOR ONLINE TRANSACTIONAL DATA PROCESSING

This application is based upon and claims the benefit of priority from prior patent application EP 04014632.6, filed Jun. 22, 2004, the entire contents of which are expressly incorporated herein by reference.

BACKGROUND

I. Technical Field

The present invention generally relates to database systems. More particularly, the invention relates to systems and methods for online transactional data processing.

II. Background Information

Many businesses and other large organizations today use relational database management systems. These systems, also known as on-line transaction processing (OLTP) systems, execute and keep track of business transactions. For example, a company that sells products or services over the Internet may use an OLTP system to record pricing information about each product for sale, billing and shipping information for each purchaser, and sales information for each order made by a purchaser. Other examples of businesses that use OLTP systems include airlines, banks, mail order companies, supermarkets, and manufacturers. In particular, OLTP systems are also used for manufacturing control data processing systems where the real-time or near-real-time capability of the OLTP system is of utmost importance.

An overview of existing OLTP techniques and OLTP applications is given, for example: "Teaching an OLTP database kernel advanced data warehousing techniques", Data Engineering, 1997, Proceedings of the 13th International Conference, Pages: 194-198; and "Performance of an OLTP application on Symmetry multiprocessor system", Computer Architecture, 1990, Proceedings of the 17th Annual International Symposium Thakkar, S. S.; Sweiger, M. Pages: 228-238.

Embodiments of the present invention provide improved online transactional data processing systems and methods that feature improved real-time capability.

SUMMARY

Consistent with an embodiment of the present invention, an online transactional data processing system is provided. The online transactional data processing system comprises a relational database for storing transactional data. An OLTP application program processes the transactional data. The OLTP application program is also operable to generate a set of change documents for each run of the OLTP application program. Each change document is descriptive of a transformation of the transactional data. A mass storage device stores the change documents.

The system may also include means for receiving a request for correction of a previous run of the OLTP application program, and means for reading the set of change documents of the previous run from the mass storage device into a random access memory. Further, means for inverting inverts the transformations as described by the set of change documents of the previous run. Means for initiating initiates a renewed run of the OLTP application program to create a new set of change documents that are temporarily stored in the random access memory. Means for overwriting overwrites at least a sub-set of the set of change documents of the previous run stored on the mass storage device by at least a sub-set of the new set of new change documents.

Also consistent with embodiments of the present invention, methods are provided for online transactional data processing. In one embodiment, a method is provided that comprises storing transactional data in a relational database. A first run of an OLTP application program is performed for processing the transactional data generating a first set of change documents. Each change document is descriptive of a transformation of the transactional data. The first set of change documents is stored on a mass storage device. A request is received for correction of the first run. The first set of change documents are read from the mass storage device into a random access memory. The transformations are inverted as described by the first set of change documents and the correction of the transactional data is performed. A second run of the OLTP application program is initiated to create a second set of change documents that is temporarily stored in the random access memory. At least a sub-set of the first set stored on the mass storage device is overwritten by at least a sub-set of the second set of change documents.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
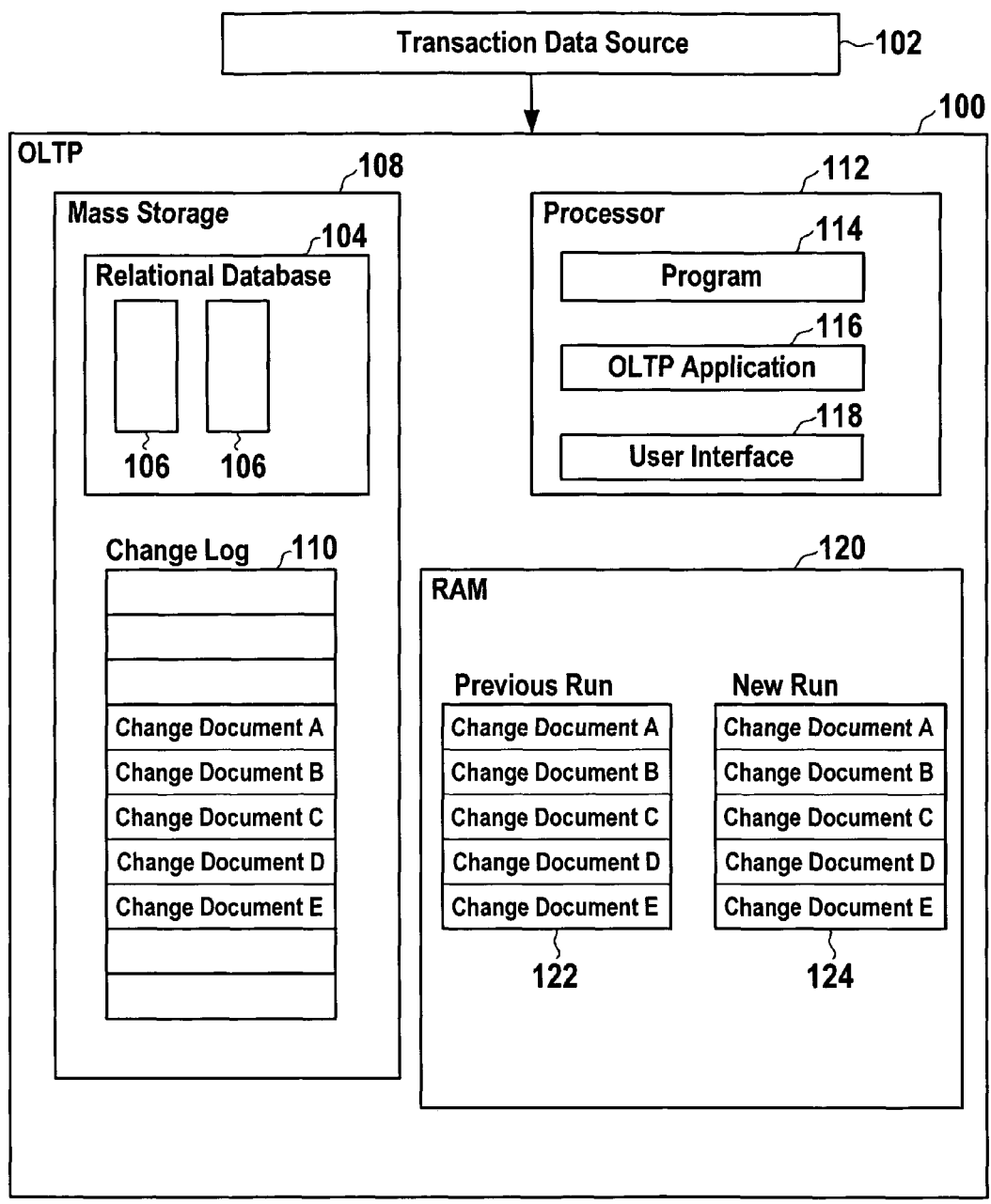
FIG. 1 is a block diagram of an exemplary OLTP system.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

Embodiments of the present invention provide an online transactional data processing system including, for example, a relational database for storing transactional data. The online transactional data processing system further includes at least one OLTP application program for processing the transactional data. By means of a run of the OLTP application program a transaction is performed on the transactional data stored in the relational database. Such a transaction performed by a run of the OLTP application program involves a plurality of transformations that are performed on the transactional data. For each transformation, the OLTP application program generates a change document that is descriptive of the transformation. The resultant set of change documents that describe the transformations performed on the transactional data by the run of the OLTP application program is stored in a change log of the OLTP system for later reference.

In some cases, it may be required to correct a previously performed transaction by re-running the OLTP application program. Such a correction may become necessary because an error has been found in the transactional data, such as an incomplete or erroneous posting received from a transaction data source coupled to the OLTP system. Before such a re-run of the OLTP application program can be performed, the initial state prior to the previous run of the OLTP application program needs to be re-established. This may be accomplished by reading the respective set of change documents from the change log into a random access memory (RAM) of the OLTP system. The set of change documents is processed in reverse order in order to invert the previously performed transformations. As a result, the initial transactional data stored in the relational database is reconstructed. Furthermore, the correction of the transactional data stored in the relational database is entered into the OLTP system, such as by completion or correction and/or adding a posting.

Next, a renewed run of the OLTP application program may be initiated to perform the transaction again on the corrected or completed transactional data stored in the relational database. This creates a new set of change documents that describes the transformations performed on the transactional data. The new set of change documents is temporarily stored in the RAM.

Next, at least a sub-set of the set of change documents stored in the change log on a mass storage device may be overwritten by at least a sub-set of equivalent change documents of the new set of change documents. In one implementation, the complete set of change documents stored in the change log is overwritten by the new set of change documents. Alternatively, only those change documents of the original set of change documents stored in the change log is overwritten that have a differing equivalent change document in the new set of change documents.

Embodiments of the present invention provide a number of access operations to the mass storage device such that updates to the change log are greatly reduced. Instead of storing a set of change documents that are descriptive of the inverse transformations and an additional set of change documents that are descriptive of the renewed transformations on the basis of the corrected or completed set of transactional data, the original set of change documents is at least partly overwritten by the new change documents. This procedure avoids a need for storage of change documents in the change log that reflect the inverse transformations. The resultant reduction of the number of access operations to the mass storage device substantially increases the real-time capability of the OLTP system, which is critical for various applications, and in particular, for the purpose of manufacturing control.

In accordance with an embodiment of the invention, a key is generated for each change document of the original set of change documents and the new set of change documents that are stored in RAM. Only change documents of the original set and the new set are compared that have the same key. If equivalent change documents that have the same keys are identical, the original change document that is already stored in the change log does not need to be overwritten by the equivalent new change document. This further reduces the number of access operations on the mass storage device.

In accordance with another embodiment of the invention, a hash key is generated for each change document of the original set and the new set of change documents. Preferably, this may be done by excluding data fields in the change documents that are affected by the re-run from the generation of the hash key. For example, the data field 'time' that indicates the creation time of a change document is excluded from the generation of the hash key as this data field by definition has changed for the re-run even if the rest of the change document has remained unchanged. Similarly, the data field 'user' that indicates the user or other entity that has requested or initiated the re-run of the OLTP application program is excluded from the generation of the hash keys.

FIG. 1 shows an exemplary OLTP system 100 that is coupled to transaction data source 102. For example, transaction data source 102 can be a data processing system for acquisition of various kinds of transactional data, such as financial data, logistics data and/or manufacturing control data. In the latter case, the transactional data can be delivered by an industrial process control system.

The transactional data provided by transaction data source 102 are stored in a relational database 104 of the OLTP system 100. The relational database 104 has a plurality of database tables 106 for storage of the transactional data on a mass storage device 108. Mass storage device 108 also serves for storing a change log 110. The change log 110 serves for storage of sets of change documents that describe transformations performed on the transactional data stored in the relational database 104.

Furthermore, OLTP system 100 includes a processor 112 for execution of a program 114, at least one OLTP application program 116, and a program module 118 that provides a user interface. OLTP system 100 also includes a random access memory (RAM) 120 that serves as a main memory for the processor 112.

In operation, OLTP system 100 receives transaction data from the transaction data source 102 that is stored by program 114 in relational database 104 on mass storage device 108. A user can select OLTP application program 116 through the user interface provided by the program module 118 for performance of a transaction on the transactional data stored in the relational database 104 by means of a run of the OLTP application program 116. Alternatively, the OLTP application program 116 is invoked automatically by the program 114 or another program not shown in FIG. 1.

Each transformation performed by the OLTP application program 116 is documented in a respective change document that describes the respective transformation. In this example, the run of the OLTP application program 116 involved five transformations on the transactional data stored in the relational database 104. The five transformation are described in respective change documents A to E.

This set of change documents is stored in the change log 110 for later reference. Preferably, the set of change documents A to E may be temporarily stored in the RAM 120 when it is created by the OLTP application program 116 before it is stored in the change log 110 on mass storage device 108. Writing the complete set of change documents A to B onto the mass storage device 108 in one write operation is preferable as it minimizes the overall storage time required for storage of the set of change documents A to E in the change log 110.

In practical applications, the number of change documents in a set of change documents that describes the transformations involved in one transaction can be much larger than in the example considered here. After the transaction has been performed by the OLTP application program 116 it might appear that the transactional data stored in the relational database 104 on which the transaction has been performed was incorrect and/or incomplete. This can be due to human error if the transaction data is manually inputted into the transaction data source 102 or it can also be due to a technical failure of a sensor or other automation component that serves for the acquisition of transactional data.

For correction of the transaction performed by the run of the OLTP application program 116 on the incorrect and/or incomplete transactional data, the initial status before the previous execution of the OLTP application program 116 needs to be re-established. This is performed by reading the set 122 of change documents A to E from the change log 110 into RAM 120.

This set of change documents 122 that describes the transformations performed during the previous run of the OLTP application program 116 is processed in reverse order starting with change document E and going backwards to change document A. For each of the transformations described in the change documents, an inverse transformation is performed by the OLTP application program 116 to re-establish the initial status of the relational database 104 with the original transactional data before the previous execution of the OLTP application program 116.

After the initial status of the relational database 104 and the initial data values of the transactional data that are stored in the relational database 104 have been re-established, the transactional data is correct and/or complete. Next, a re-run of the OLTP application program 116 is initiated by the program 114 in order to perform the transaction again on the corrected and/or completed transactional data. The new run of the OLTP application program 116 creates a corresponding new set of 124 of change document A to E that is also stored in the RAM 120.

Next, an access operation on the mass storage device 108 is performed to overwrite the original set of change documents A to E stored in the change log 110 by the new set 124 of change documents. For further minimization of the media access time to the mass storage device 108, only those change documents of the change log 110 are overwritten that have actually changed in the new set 124. In this case, the original set 122 and the new set 124 are compared for determination of such change documents of the respective sets that actually differ. Only those original change documents that differ from the equivalent new change documents are overwritten in the change log 110 by the equivalent new change documents.

For example, the comparison of the original set 122 and the new set 124 of change documents shows that a new change document B of the new set 124 is different from the original change document B in the original set 122 and that all other equivalent change documents A and C to E of the original set 122 and the new set 124 are identical. In this case, only the change document B in the change log 110 needs to be overwritten by the equivalent new change document B of the new set 124.

One way of implementing the comparison between the original set 122 and the new set 124 of change documents is by generating a key, such as a hash key, for each change document of the original set 122 and the new set 124. Those change documents that have the same keys are identified as equivalent and only the equivalent change documents need to be compared. This reduces the data processing load for identification of equivalent, differing change documents in the original set 122, and the new set 124.

Figure 2:
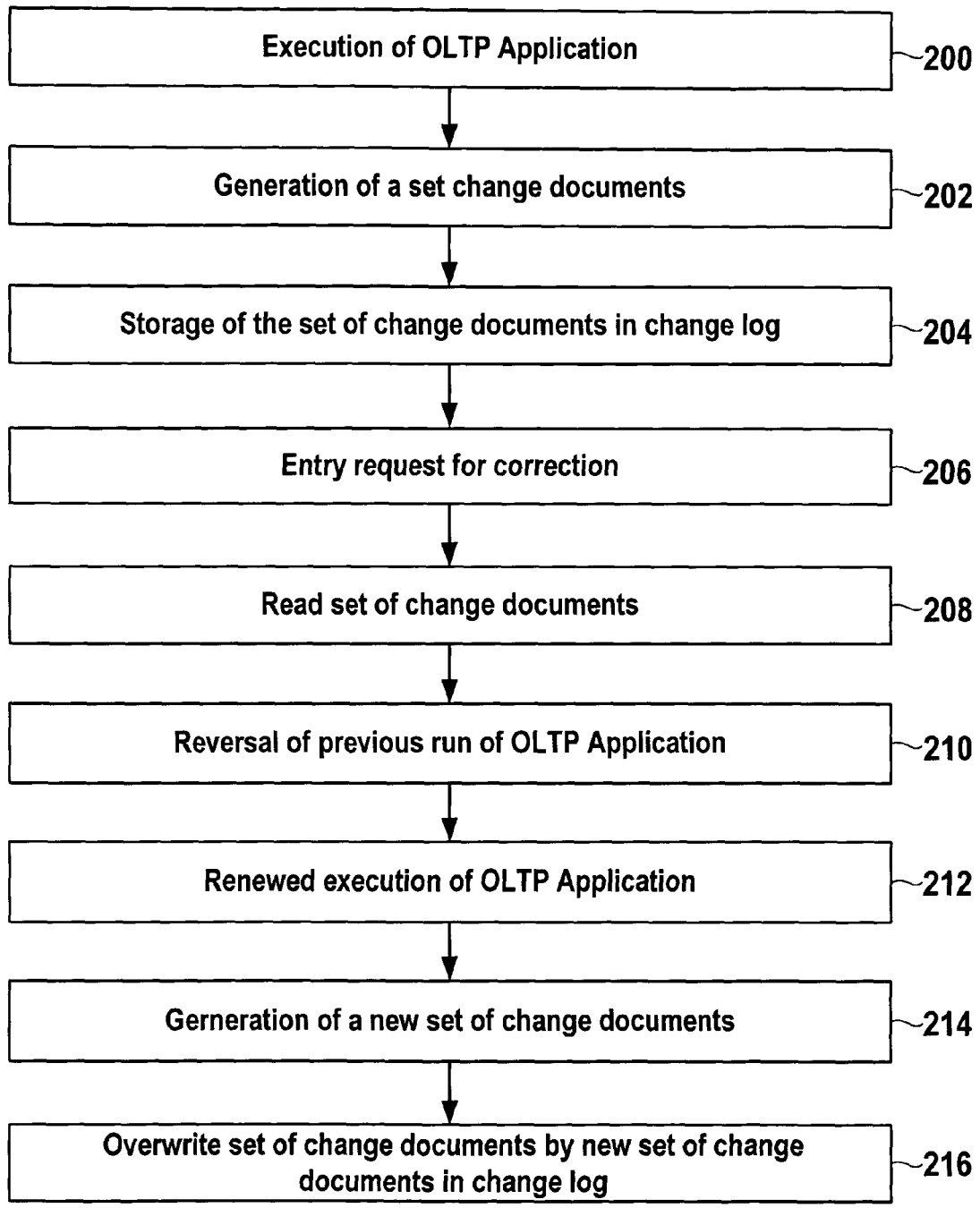
FIG. 2 is a flowchart illustrating an exemplary first mode of operation of the OLTP system of FIG. 1.

FIG. 2 shows a flow chart of an exemplary first mode of operation of the OLTP system 100 of FIG. 1. In step 200, the OLTP application program is executed in order to perform a transaction on the transactional data stored in the relational database. This results in a set of change documents where each change document of the set describes one transformation performed on the transactional data by the run of the OLTP application program (step 202). In step 204, the set of change documents is stored in the change log on the mass storage device.

In step 206, a request for correction is entered. This request for correction may comprise corrective data for correction and/or completion of the transactional data that formed the basis for the initial execution of the OLTP application program that was initiated in step 200. In response to the request for correction entered in step 206, the original set of change documents is read from the change log in step 208 into RAM. In step 210, the previous run of the OLTP application program is reverted by performing the inverse transformations for each of the transformations described in the original set of change documents that have been read into the RAM in reverse order.

As a result of step 210, the initial status of the relational database is re-established and the corrective data that is provided together with the request for correction is entered into the relational database. On this basis, a renewed execution of the OLTP application program is initiated in step 212. This results in a generation of a new set of change documents that is also temporarily stored in RAM (step 214).

In step 216, the original set of change documents stored in the change log is overwritten by the new set of change documents by directing a corresponding write command to the mass storage device. Preferably this may be done by means of a single write command in order to minimize the hardware access time of the mass storage device.

Figure 3:
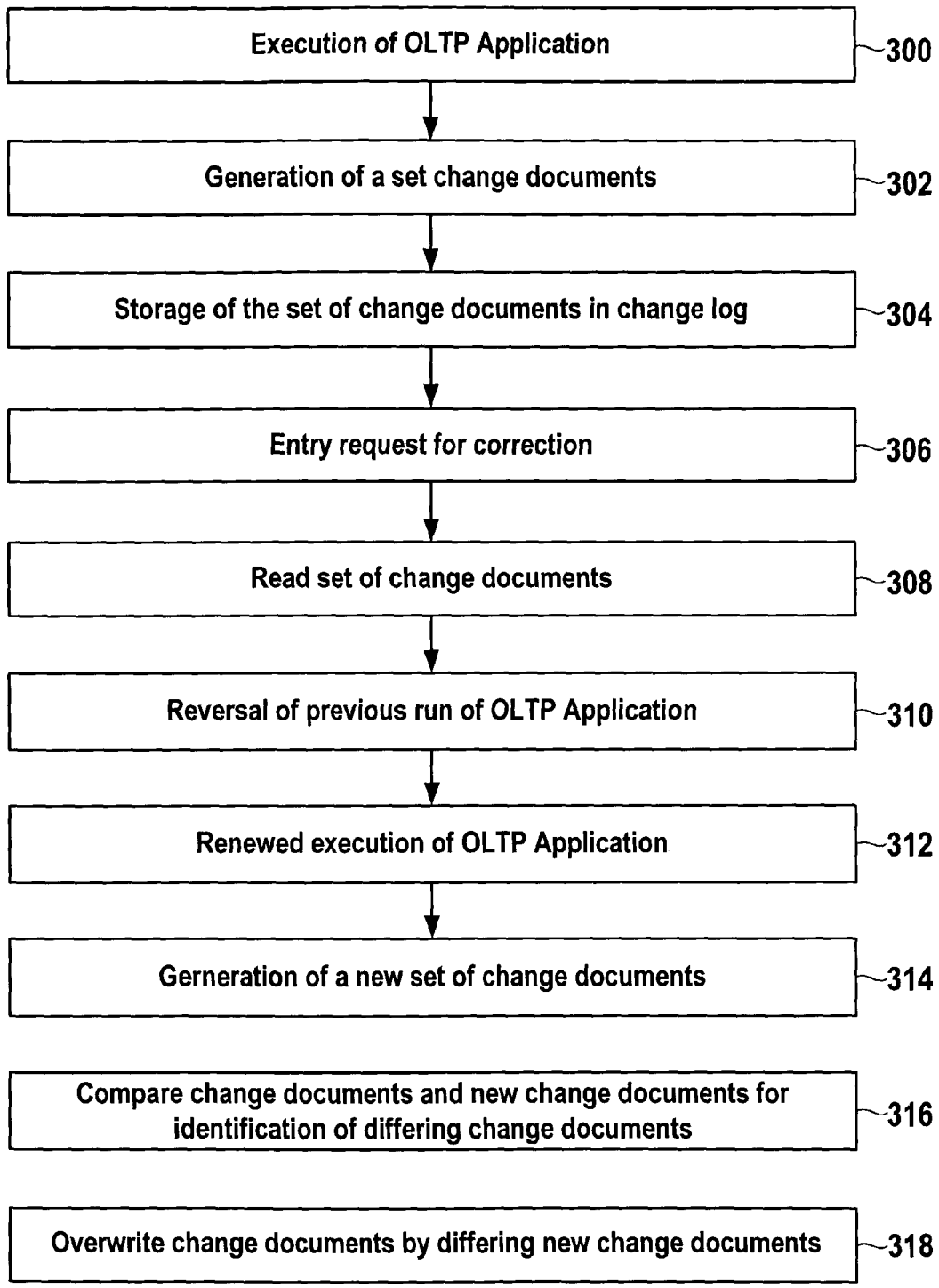
FIG. 3 is a flowchart illustrating an exemplary second mode of operation of the OLTP system of FIG. 1.

FIG. 3 shows an alternative method. In FIG. 3, an exemplary second mode of operation is illustrated that may further minimize the time required for updating the change log stored on the mass storage device. The initial steps 300 to 314 are identical to the steps 200 to 214 of FIG. 1. However, in step 316, the change documents contained in the new set of change documents and the change documents contained in the original set of change documents are compared for identification of equivalent, differing change documents. Only such change documents contained in the original set are overwritten in the change log that have an equivalent new change document in the new set of change documents that differs (step 318).

Figure 4:
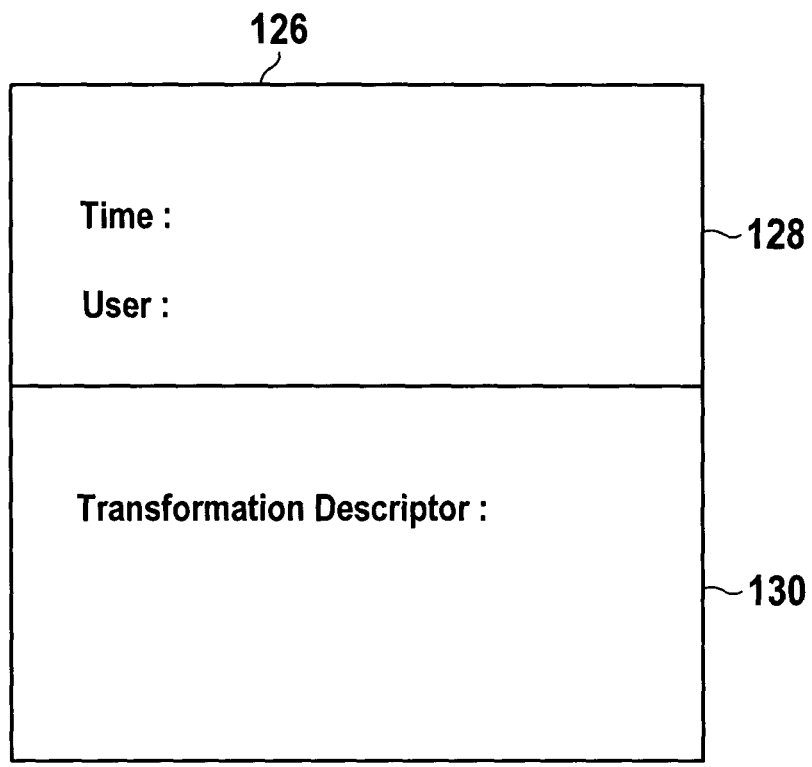
FIG. 4 schematically illustrates an exemplary structure of a change document.

FIG. 4 shows a schematic example of an exemplary structure of a change document 126. The change document 126 may include a header portion 128 that carries the data fields 'time' and 'user'. The data field 'time' indicates the time of creation of the change document 126 and the data field 'user' indicates the user or entity that has initiated or requested the run of the OLTP application program that resulted in the creation of the change document 126.

As further shown in FIG. 4, the change document 126 may also include a body portion 130 that carries a transformation descriptor. The transformation descriptor describes a transformation performed by the OLTP application program on the transactional data. Equivalent change documents of the original set and the new set typically have the same transformation descriptors as the type of transformation is unchanged but differing entries in the 'time' and/or 'user' data fields.

Figure 5:
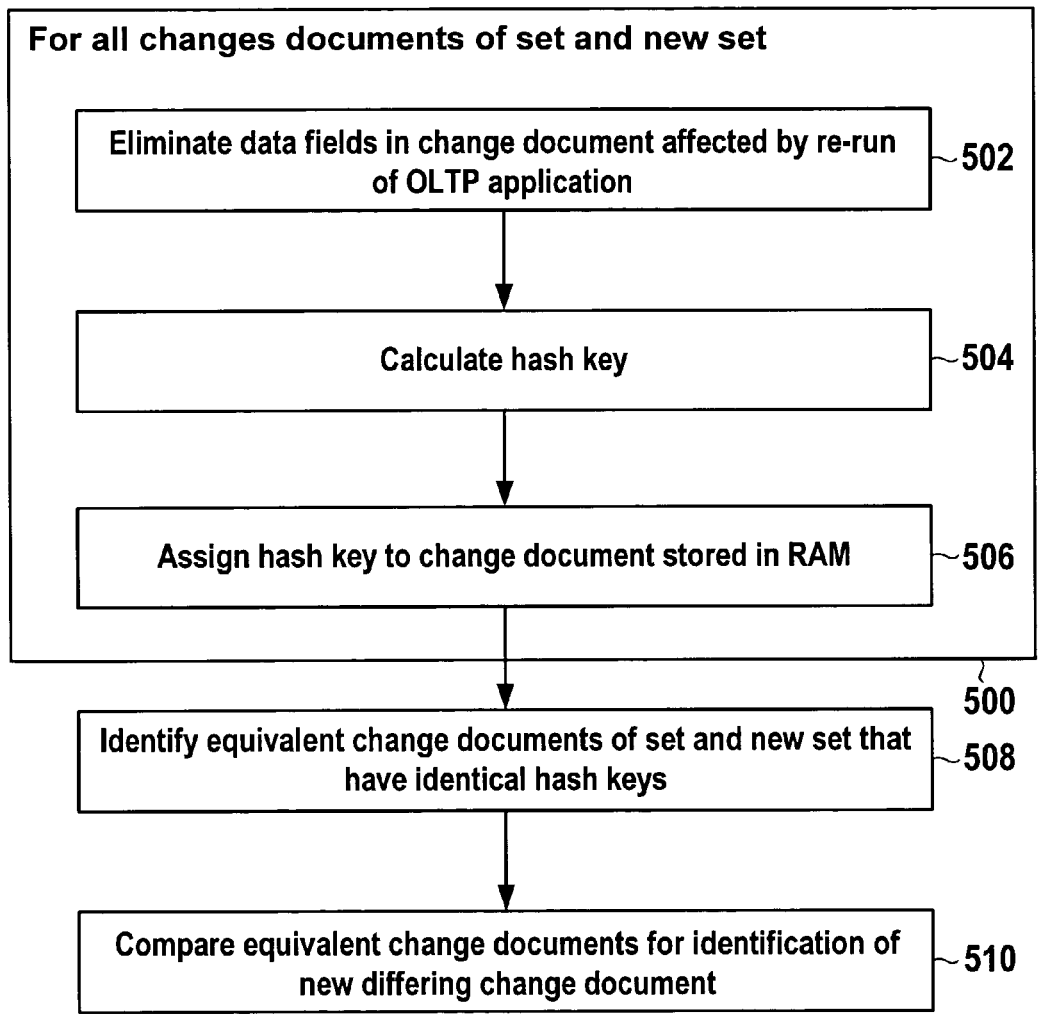
FIG. 5 illustrates an exemplary method for identification of equivalent change documents by means of hash keys.

FIG. 5 illustrates an exemplary method for identification of equivalent change documents to increase the speed of comparison of the original and new sets of change documents. Step 500 of the procedure is performed for all change documents of the original and new sets of change documents. Procedure 500 involves the steps 502 to 506.

In step 502, the data fields in a given change document that are affected by the re-run of the OLTP application program are eliminated. In the exemplary structure of change document 126 shown in FIG. 4 this means that the data fields 'time' and 'user' are eliminated or ignored for the purpose of the following calculation of a hash key for the change document in step 504. In fact, the hash key is calculated for the transformation descriptor contained in the body portion 130 of the change document 126 in the example considered here. For calculation of the hash key, any suitable hash function can be used for generation of a 'digital fingerprint' of the change document. Examples for suitable hash functions include MD-5 and SHA1.

In step 506, the hash key that has been obtained as a result of step 504 is assigned to the change document that is stored in the RAM (step 506). After performance of the procedure 500 for all change documents step 508 is carried out. In step 508, pairs of documents of the original set and the new set of change documents are identified that have identical hash keys. Such pairs of documents may be considered equivalent. In step 510, the equivalent change documents that have been identified in step 508 are compared for identification of equivalent change documents that differ. Only original change documents stored in the change log that have an equivalent differing new change document are overwritten.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Examples of hardware include computing or processing systems, including personal computers, servers, laptops, mainframes, microprocessors and the like. Additionally, although aspects of the invention are described for being stored in memory, one skilled in the art will appreciate that these aspects can also be stored on other types of computer-readable media, such as secondary storage devices, for example, hard disks, floppy disks, CD-ROM, or other forms of RAM or ROM.

Computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets or in SAP R/3 or ABAP. One or more of such software sections or modules can be integrated into a computer system or existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. An online transactional processing (OLTP) system, comprising:
    a relational database for storing transactional data;
    an OLTP application program for processing the transactional data, the OLTP application program generating a set of change documents for a run of the OLTP application program, wherein the set of change documents includes descriptions of transformations performed on the transactional data by the run of the OLTP application program;
    a mass storage device for storing the change documents;
    means for receiving a request for correction of a previous run of the OLTP application program;
    means for reading the set of change documents of the previous run from the mass storage device into a random access memory;
    means for inverting the transformations as described by the set of change documents of the previous run;
    means for initiating a renewed run of the OLTP application program to create a new set of change documents that are temporarily stored in the random access memory;
    means for identifying corresponding change documents of the previous and the renewed run that differ from each other; and
    means for overwriting at least a sub-set of the set of change documents of the previous run stored on the mass storage device by at least a sub-set of the new set of new change documents, wherein the means for overwriting overwrites only change documents of the previous run for which a differing corresponding change document of the renewed run is identified.

2. The online transactional data processing system of claim 1, further comprising:
    means for generating a key for each change document, and wherein equivalent change documents are identified by the same key.

3. The online transactional data processing system of claim 2, wherein the key is a hash key.

4. The online transactional data processing system of claim 2, wherein the means for generating a key for a change document excludes a portion of the change document from the generation of the key that is affected by the renewed run.

5. The online transactional data processing system of claim 4, wherein the means for generating a key excludes a time or user indication contained in a change document when generating the key.

6. A computer-implemented method of online transactional processing (OLTP), comprising steps performed by a computer of:
    storing transactional data in a relational database;
    performing a first run of an OLTP application program for processing the transactional data generating a first set of change documents, wherein the first set of change documents include descriptions of transformations performed on the transactional data by the first run of the OLTP application program;
    storing the first set of change documents on a mass storage device;
    receiving a request for correction of the first run;
    reading the first set of change documents from the mass storage device into a random access memory;
    inverting the transformations as described by the first set of change documents;
    performing the correction of the transactional data;

initiating a second run of the OLTP application program to create a second set of change documents that is temporarily stored in the random access memory;

identifying corresponding change documents of the first and the second run that differ from each other; and overwriting at least a sub-set of the first set stored on the mass storage device by at least a sub-set of the second set of change documents, wherein only change documents of the first run for which a differing corresponding change document of the second run is identified are overwritten.

7. The method of online transactional data processing of claim 6, further comprising:

generating a key for each change document of the first and second sets stored in the random access memory, wherein equivalent change documents are identified by identical keys; and comparing only equivalent change documents of the first and second sets, wherein a change document of the first set is overwritten by an equivalent change document of the second set stored in the mass storage device when the equivalent change document of the second set differs from the change document of the first set.

8. The method of online transactional data processing of claim 7, wherein the key is a hash key.

9. The method of online transactional data processing of claim 7, wherein data fields of the set of first and second change documents that are affected by the second run are excluded from the generation of the key.

10. The online transactional data processing method of claim 6, wherein each change document includes a time data field indicative of a time when the change document was created or a user data field indicative of an entity that caused or requested the respective run of the OLTP application program, and the time data field or the user data field is excluded from the generation of the key.

11. A non-transitory computer-readable storage medium comprising program code instructions for executing a method for online transactional processing (OLTP), the method comprising:

storing transactional data in a relational database;

performing a first run of an OLTP application program for processing the transactional data generating a first set of change documents, wherein the first set of change documents include descriptions of transformations performed on the transactional data by the first run of the OLTP application program;

storing the first set of change documents on a mass storage device;

receiving a request for correction of the first run;

reading the first set of change documents from the mass storage device into a random access memory;

inverting the transformations as described by the first set of change documents;

performing the correction of the transactional data;

initiating a second run of the OLTP application program to create a second set of change documents that is temporarily stored in the random access memory;

identifying corresponding change documents of the first and the second run that differ from each other; and overwriting at least a sub-set of the first set stored on the mass storage device by at least a sub-set of the second set of change documents, wherein only change documents of the first run for which a differing corresponding change document of the second run is identified are overwritten.

12. The non-transitory computer-readable storage medium of claim 11, the method further comprising:

generating a key for each change document of the first and second sets stored in the random access memory, wherein equivalent change documents are identified by identical keys; and comparing only equivalent change documents of the first and second sets, wherein a change document of the first set is overwritten by an equivalent change document of the second set stored in the mass storage device when the equivalent change document of the second set differs from the change document of the first set.

13. The non-transitory computer-readable storage medium of claim 12, wherein the key is a hash key.

14. The non-transitory computer-readable storage medium of claim 12, wherein data fields of the set of first and second change documents that are affected by the second run are excluded from the generation of the key.

15. The non-transitory computer-readable storage medium of claim 11, wherein each change document includes a time data field indicative of a time when the change document was created or a user data field indicative of an entity that caused or requested the respective run of the OLTP application program, and the time data field or the user data field is excluded from the generation of the key.

* * * * *